United States Patent

Kasahara et al.

Patent Number: 5,374,409
Date of Patent: Dec. 20, 1994

[54] PURIFYING GASES WITH AN ALKALI METAL AND TRANSITION METAL CONTAINING ZEOLITE

[75] Inventors: Senshi Kasahara, Shinnanyo; Shuji Okazaki, Yamaguchi; Kazuhiko Sekizawa, Shinnanyo, all of Japan

[73] Assignee: Tosoh Corporation, Shinnanyo, Japan

[21] Appl. No.: 717,659

[22] Filed: Jun. 19, 1991

[30] Foreign Application Priority Data

Jun. 20, 1990 [JP] Japan .................. 2-159913
Jun. 21, 1990 [JP] Japan .................. 2-161315
Jul. 23, 1990 [JP] Japan .................. 2-193062
Jul. 23, 1990 [JP] Japan .................. 2-193063

[51] Int. Cl.$^5$ .............................. C01B 21/20
[52] U.S. Cl. .................. 423/213.2; 423/213.5; 423/239.2
[58] Field of Search ......... 423/213.5, 213.2, 239, 423/239.1, 239.2

[56] References Cited

U.S. PATENT DOCUMENTS

| | | | |
|---|---|---|---|
| 3,881,696 | 5/1975 | Lepeytre et al. | 252/455 R |
| 4,642,409 | 2/1987 | Sato et al. | 585/486 |
| 4,867,954 | 9/1989 | Staniulis et al. | 423/239 |
| 4,999,173 | 3/1991 | Kamiyama et al. | 423/239 |
| 5,154,902 | 10/1992 | Inui et al. | 423/239 |
| 5,223,236 | 6/1993 | Inoue et al. | 423/213.2 |
| 5,270,024 | 12/1993 | Kasahara et al. | 423/213.2 |

FOREIGN PATENT DOCUMENTS

| | | | |
|---|---|---|---|
| 0020799 | 1/1981 | European Pat. Off. | 423/213.5 |
| 0260071 | 3/1988 | European Pat. Off. | |
| 0306035 | 3/1989 | European Pat. Off. | |
| 219397 | 11/1985 | German Dem. Rep. | |
| 1963012 | 10/1970 | Germany . | |
| 2140852 | 2/1973 | Germany | 423/213.5 |
| 3035430 | 4/1980 | Germany . | |
| 3932452 | 4/1990 | Germany . | |
| 60-125250 | 4/1985 | Japan | B01J 29/34 |
| 63-100919 | 6/1988 | Japan | B01D 53/36 |

OTHER PUBLICATIONS

Database WPIL Derwent Publications Ltd., London, GB; Database WPIL accession No. 86-135575, week 8621; & SU -A -1189491 (Tbil Univ) Nov. 7, 1985.

*Primary Examiner*—Gary P. Straub
*Assistant Examiner*—Timothy C. Vanoy
*Attorney, Agent, or Firm*—Oblon, Spivak, McClelland, Maier & Neustadt

[57] ABSTRACT

A method for purifying an exhaust gas using a transition metal-containing zeolite having a high hydrothermal stability having the formula, in terms of a molar composition of oxides:

$$aA_2O \cdot bM_{2/n}O \cdot Al_2O_3 \cdot cSiO_2 \cdot dH_2O \qquad (I)$$

wherein a is 0.2 to 1.0, b is more than 0 but not more than 1.5, c is at least 10, d is an arbitrary number, A is potassium or cesium, M is a transition metal and n is a valence number of the metal M.

4 Claims, No Drawings

PURIFYING GASES WITH AN ALKALI METAL AND TRANSITION METAL CONTAINING ZEOLITE

BACKGROUND OF THE INVENTION

1. Field of the Invention

The present invention relates to a method for purifying an exhaust gas using a transition metal-containing zeolite having a high hydrothermal stability which can be used as a catalyst and an adsorbent. More specifically it relates to a transition metal-containing zeolite, the crystal of which does not collapse even when the zeolite is used in an atmosphere containing moisture at high temperature, and further, relates to a method of producing the zeolite. The present invention further relates to a catalyst for treating an exhaust gas discharged from, for example, a boiler or an automobile engine, and containing nitrogen oxides, and to a method of using same, and more particularly, to a catalyst, for purifying an exhaust gas, having an extremely high durability, and to a method of using the catalyst.

2. Description of the Related Art

Transition metal-containing zeolites are now widely used as a catalyst in the fields of oil refining, petrochemistry and environmental purification, and as an adsorbent of a gas, or the like. In these applications, the environment in which the zeolite is used very often reaches a high temperature, and thus the development of a transition metal-containing zeolite having a high heat resistance and a high hydrothermal stability is urgently required.

It is known that the heat resistance of the transition metal-containing zeolite is affected by the kind of zeolites, and a molar ratio of $SiO_2/Al_2O_3$ and the like, and zeolites having a higher $SiO_2/Al_2O_3$ molar ratio exhibit a particularly high heat resistance. Nevertheless, when the transition metal-containing zeolite is used as a catalyst or an adsorbent, and the like, the zeolite must contain a greater amount of transition metals as an active site, through an ion-exchange, and thus zeolites having a lower $SiO_2/Al_2O_3$ molar ratio are often required.

As mentioned above, the transition metal-containing zeolite has the problems of a low heat resistance and hydrothermal stability, and thus is not particularly useful in an atmosphere containing moisture at high temperature.

On the other hand, a selective catalytic reduction method using ammonia in the presence of a catalyst, and a non-selective catalytic reduction method which passes an exhaust gas through a catalyst and reduces nitrogen oxides by unburnt or remaining carbon monoxide and hydrocarbons, are in practical use as a method of removing nitrogen oxides in an exhaust gas discharged from, for example, a boiler or an automobile engine.

Japanese Unexamined Patent Publication (Kokai) No. 60-125250 proposes a zeolite, which is subjected to copper ion exchange, as a catalyst which can directly catalytically decompose the nitrogen oxides in the absence of a reducing agent.

Furthermore, a catalyst containing a base metal or metals, in the zeolite composition thereof has been proposed as a catalyst which can selectively reduce nitrogen oxides by reducing agents such as unburnt carbon monoxide and hydrocarbons even in the presence of an excess oxygen, to purify the exhaust gas of a Diesel engine and a lean burn engine aimed at reducing fuel consumption (see Japanese Unexamined Patent Publication (Kokai) No. 63-100919).

Nevertheless, the catalysts proposed in these prior art references still have a problem of durability, particularly at high temperatures, and thus are not in practical use.

SUMMARY OF THE INVENTION

Accordingly, the objects of the present invention are to eliminate the above-mentioned disadvantages of the prior art and to provide a transition metal-containing zeolite which can be used as a catalyst and an adsorbent in an atmosphere containing moisture at high temperature.

Another object of the present invention is to provide a catalyst, for purifying an exhaust gas, which can efficiently purify an exhaust gas, particularly an oxygen-rich exhaust gas, discharged from, for example, an internal combustion engine of an automobile without using a reducing agent such as ammonia, and which has a high durability at a high temperature in an atmosphere containing moisture.

Other objects and advantages of the present invention will be apparent from the following description.

In accordance with the present invention, there is provided a transition metal-containing zeolite having a high hydrothermal stability having the formula (I), in terms of a molar composition of oxides:

$$aA_2O \cdot bM_{2/n}O \cdot Al_2O_3 \cdot cSiO_2 \cdot dH_2O \qquad (I)$$

wherein a is 0.2 to 1.0, b is greater than 0 but smaller than 1.5, c is greater than 10, d is an arbitrary number, A is potassium or cesium, M is a transition metal and n is a valence number of the metal M.

In accordance with the present invention, there is also provided a method of producing a transition metal-containing zeolite having a high hydrothermal stability, comprising subjecting a zeolite having a molar ratio of $SiO_2/Al_2O_3$ of at least 10 to an ion-exchange treatment using a neutral salt of potassium or cesium, and to an ion-exchange treatment using a neutral salt of a transition metal.

Furthermore, in accordance with the present invention, there is provided a catalyst for purifying an exhaust gas, comprising the above-mentioned, zeolite, and a method of using the catalyst.

DESCRIPTION OF THE PREFERRED EMBODIMENTS

The present invention will now be explained in further detail.

The zeolite usable in the present invention essentially must have an $SiO_2/Al_2O_3$ molar ratio of at least 10. The upper limit of this $SiO_2/Al_2O_3$ molar ratio is not particularly limited, but when the $SiO_2/Al_2O_3$ molar ratio is less than 10, a desired hydrothermal stability cannot be obtained. The molar ratio is preferably from 20 to 100.

The kind of zeolites usable in the present invention is not particularly limited, and zeolites such as mordenite, ferrierite, ZSM-5, ZSM-8, ZSM-11, ZSM-12, ZSM-20, ZSM-35, and so forth can be used. Among these zeolites, ZSM-5 is particularly suitable for the purpose of the present invention. The method of producing these zeolites is not particularly limited, and zeolites which are obtained by dealumination from Y-type and L-type zeolites also can be used.

The crystal size of the zeolite usable in the present invention is not particularly limited but is preferably at least 1 $\mu$m. When the crystal size is less than 1 $\mu$m, the heat resistance of the zeolite crystal itself becomes poor and the hydrothermal stability is lowered. More preferably, the crystal size is from 1 μm to 50 μm.

The transition metal-containing zeolite having a high hydrothermal stability in accordance with the present invention essentially must contain 0.2 to 1.0 of potassium or cesium in terms of an $A_2O/Al_2O_3$ molar ratio, wherein A represents potassium or cesium (hereinafter the same) and up to 1.5 of a transition metal in terms of an $M_{2/n}O/Al_2O_3$ molar ratio. A required hydrothermal stability cannot be obtained when the potassium or cesium is less than 0.2 in terms of an $A_2O/Al_2O_3$ molar ratio. When the potassium or cesium exceeds 1.0 in terms of an $A_2O/Al_2O_3$ molar ratio or when the transition metal is more than 1.5 in terms of an $M_{2/n}O/Al_2O_3$ molar ratio, on the other hand, potassium or cesium or the transition metal exist as oxides on the zeolite surface and therefore the hydrothermal stability will be lowered. When an $(A_2O+M_{2/n}O)/Al_2O_3$ molar ratio is more than 2.0, potassium or cesium or the transition metal often exist as oxides on the zeolite surface, and thus the hydrothermal stability is lowered.

The sodium (Na) content of the transition metal-containing zeolite having a high hydrothermal stability in accordance with the present invention is not particularly limited but is preferably up to 0.01 in terms of a $Na_2O/Al_2O_3$ molar ratio. When this value is more than 0.01, the hydrothermal stability is adversely affected.

The transition metal is not particularly limited and Fe, Cu, Co, Ni, Cr and Mn, for example, can be used in the present invention.

It is essential in the production method of the present invention to subject a zeolite having an $SiO_2/Al_2O_3$ molar ratio of at least 10 to an ion-exchange treatment using a neutral salt of potassium (K) or Cesium (Cs), and to an ion-exchange treatment using a neutral salt of a transition metal.

Synthetic zeolites or calcined products thereof can be used as the raw zeolites, but are used preferably after ions such as Na ions in the raw zeolite, which will otherwise adversely affect the heat resistance of the zeolite, have been removed by an ammonia treatment, or the like.

The ammonia treatment is carried out by mixing the raw zeolite in an ammonia-containing aqueous solution and stirring, followed then by washing. Ammonium chloride, ammonium nitrate, ammonium sulfate, aqueous ammonia, and the like, are used as ammonia. The amount of addition of ammonia and the treating condition are not particularly but preferably, the ions such as Na ions existing on the ion exchange site of the raw zeolite are reduced down to 0.01 in terms of the $Na_2O/Al_2O_3$ molar ratio. When the content of ions such as the Na ions are more than 0.01, the hydrothermal stability becomes low.

The amount of addition of ammonia is not limited, in particular, but preferably is two to ten times the equivalent for Al in the zeolite. When the amount is less than twice the equivalent, the ions such as the Na ions might exceed 0.01 in terms of the $Na_2O/Al_2O_3$ molar ratio, and even when the amount is greater than ten times the equivalent, an effect corresponding to such an amount cannot be obtained. The slurry concentration of the ammonia treatment is preferably from 5% to 50% of that usually employed.

Although the ammonia treating condition is not particularly limited, the treatment is preferably carried out at a temperature of from room temperature to 100° C. for one hour to 3 days, as usually employed when the treating temperature is below a room temperature or the treating time is less than one hour, the ions such as Na ions might exceed 0.01 in terms of the $Na_2O/Al_2O_3$ molar ratio, and even when the treating temperature or the treating time is more than 100° C. or 3 days, respectively, an effect corresponding to the temperature and time cannot be obtained.

To remove the ions such as Na ion, a method which treats the raw zeolite with a mineral acid also can be employed.

The raw zeolite is subjected to an ion-exchange by K or Cs and the transition metal. The sequence of this ion-exchange is not particularly limited; the ion-exchange by K or Cs and the ion-exchange by the transition metal may be carried out either sequentially, or may be effected simultaneously. Preferably, however, the ion-exchange by K or Cs is first effected and then the ion-exchange by the transition metal is effected. When the ion-exchange by K or Cs is effected after the ion-exchange by the transition metal, the transition metal ions that are subjected to the ion-exchange fall from the ion-exchange site at the time of exchange with K or Cs and large quantities of the transition metal thereof will exist as oxides on the zeolite surface, and thus hydrothermal stability becomes low.

The K or Cs ion-exchange method is not particularly limited but is carried out by mixing the starting zeolite in an aqueous solution containing a neutral salt of K or Cs, and stirring the slurry and washing the zeolite.

The neutral salt of K or Cs is not particularly limited, and the neutral salts of K or Cs such as chlorides, nitrates, sulfates, acetates, and so forth are used as desired.

The amount of addition of the K or Cs ions is not particularly limited but is preferably from 1 to 30 times the equivalent for Al in the zeolite. When it is less than one time the equivalent, the K or Cs ions are not sufficiently exchanged and the amount of the ions might be less than 0.2 in terms of the $A_2O/Al_2O_3$ molar ratio. Even when the amount is more than 30 times, an effect corresponding to such an amount cannot be obtained. The slurry concentration of the ion-exchange is preferably from 5% to 50% as usually employed.

Preferably the treating condition has a temperature of from room temperature to 100° C. and a treating time of from one hour to 3 days as usually employed. When the treatment is carried out at a temperature of less than the room temperature or for a time of less than one hour, the K or Cs ions are not sufficiently exchanged and the ions might be less than 0.2 in terms of the $A_2O/Al_2O_3$ molar ratio. Even when the treatment is carried out at a temperature above 100° C. or for a treating time exceeding 3 days, an effect corresponding to such a treating condition cannot be obtained. The ion-exchange operation may be carried out repeatedly, whenever necessary.

The transition metal ion-exchange method is not particularly limited but is preferably carried out by mixing the zeolite subjected to the K or Cs ion-exchange treatment in an aqueous solution containing the neutral salt of the transition metal, stirring the slurry, and washing the zeolite.

The neutral salt of the transition metal is not particularly limited, and the neutral salts of the transition metal such as chlorides, nitrates, sulfates and acetates are used as desired.

The amount of the transition metal ions added is not particularly limited but is preferably below 20 times the equivalent for Al in the zeolite. When the amount exceeds 20 times, the ions might exceed 1.5 in terms of the $M_{2/n}O/Al_2O_3$ molar ratio. The slurry concentration of the ion-exchange is preferably from 5% to 50% as usually employed.

Preferably the treating condition has a treating temperature of from room temperature to 100° C. and a treating time of less than 3 days as usually employed. When the treating temperature exceeds 100° C. or the treating time exceed 3 days, the ions might exceed 1.5 in terms of the $M_{2/n}O/Al_2O_3$ molar ratio. The ion-exchange operation may be repeated, whenever necessary.

The $SiO_2/Al_2O_3$ molar ratio of the transition metal-containing zeolite having a high hydrothermal stability in accordance with the present invention is not substantially different from the $SiO_2/Al_2O_3$ molar ratio of the zeolite base used. The crystal structure of the transition metal-containing zeolite having a high hydrothermal stability essentially does not change before and after the ion-exchange treatment.

The transition metal-containing zeolite having a high hydrothermal stability in accordance with the present invention can be used after mixed with a binder such as a clay mineral and molded. The binder used at the time of molding of the zeolite is a clay mineral such as kaolin, attapulgite, montmorillonite, bentonite, allophane, sepiolite, and the like. Alternatively, the raw zeolite may be a binderless zeolite molded article obtained by directly synthesizing a molded article without using the binder.

When used for purifying an exhaust gas, the zeolite described above can be used as is and wash-coated on a honeycomb support made of cordierite or a metal.

The processing of a combustion exhaust gas containing nitrogen oxides is carried out by bringing the catalyst for purifying the exhaust gas in accordance with the present invention into contact with the exhaust gas. The exhaust gas to be treated by the present invention must essentially contain the nitrogen oxides, and the present invention is effective particularly when oxygen, carbon monoxide, hydrocarbons, hydrogen, ammonia, and the like, are contained in the exhaust gas. Preferred is an oxygen-rich exhaust gas containing nitrogen oxides, carbon monoxide and hydrocarbons. The term "oxygen-rich exhaust gas" means an exhaust gas which contains oxygen in a greater excess than the amount of oxygen necessary for completely oxidizing carbon monoxide, hydrocarbons and hydrogen contained in the exhaust gas. In the case of the exhaust gas emitted from an internal combustion engine of an automobile or the like, for example, the term represents the state (i.e., the lean condition) where an air-fuel ratio is high.

The concentration of nitrogen oxides in the combustion exhaust gas as the object of treatment is not particularly limited but is preferably from 10 to 10,000 ppm.

The space velocity and temperature of the exhaust gas in purifying exhaust gas are not particularly limited, but the space velocity (based on the volume) and the temperature are preferably 1,000 to 500,000 hr$^{-1}$ and 100° C. to 900° C., respectively.

The transition metal-containing zeolite having a high hydrothermal stability in accordance with the present invention exhibits little drop of the crystallinity thereof even when treated at a high temperature in the presence of a vapor. The reason why the transition metal-containing zeolite of the present invention exhibits a high hydrothermal stability has not yet been sufficiently clarified, but is assumed to be because the dealumination becomes difficult and the durability of the zeolite itself is improved due to co-existence of potassium or cesium and a degradation of the activity due to an aggregation of the transition metal as an active species is prevented.

A traditional metal-containing zeolite has lower hydrothermal stability and the crystal system in that zeolite is often altered by the hydrothermal treatment, for example, in the case of ZSM-5 the crystal system is transformed from orthorhombic to monoclinic. However the crystal system in the transition metal and cesium containing zeolite in accordance with the present invention is not transformed by the hydrothermal treatment.

The transition metal-containing zeolite having a high hydrothermal stability in accordance with the present invention exhibits a very high hydrothermal stability and can exhibit this effect when used as a catalyst for oil refining, petrochemistry and environmental purification or an adsorbent, particularly when used in a high temperature environment containing moisture.

EXAMPLES

The present invention will now be further illustrated by, but is by no means limited to, the following Examples.

Example 1

An aqueous sodium silicate solution ($SiO_2$: 250 g/l, $Na_2O$: 82 g/l, $Al_2O_3$: 2.8 g/l) and an aqueous aluminum sulfate solution ($Al_2O_3$: 8.8 g/l, $H_2SO_4$: 370 g/l) were fed continuously with stirring at rates of 3 l/hr and 1 l/hr, respectively, into an overflow type reactor having an actual volume of 2 l. The reaction temperature was from 30° to 32° C. and the pH of the discharged slurry was from 6.7 to 7.0.

After the discharged slurry was subjected to solid-liquid separation and the solid was washed with water, a granular amorphous aluminosilicate uniform compound containing 0.75 wt % of $Na_2O$, 0.77 wt % of $Al_2O_3$, 36.1 wt % of $SiO_2$ and 62.5 wt % of $H_2O$ was obtained, and 2,860 g of this uniform compound and 6,150 g of an aqueous 3.2 wt % NaOH solution were fed into an autoclave, and a crystallization was carried out at 160° C. for 72 hours with stirring. The resulting reaction product was subjected to solid-liquid separation, washed with water, and dried to provide a TSZ1 zeolite similar to ZSM-5. The crystal size of TSZ1 was from 2 to 3 μm. As a result of chemical analysis, the zeolite was found to have the following composition as expressed in terms of the molar ratio of oxides in the anhydrous basis:

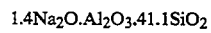

$1.4Na_2O.Al_2O_3.41.1SiO_2$

Then 100 g of this zeolite was added to 1,000 cc of an aqueous solution containing 20.0 g of $NH_4Cl$ and the mixture was stirred at 60° C. for 20 hours. The reaction product was washed and dried to provide an $NH_4$ type TSZ1. The Na content of the resulting $NH_4$ type TSZ1 was less than 0.01 in terms of an $Na_2O/Al_2O_3$ molar ratio.

Then 50 g of this $NH_4$ type TSZ1 was added to 500 cc of an aqueous solution containing 14.5 g of KCl, and after the mixture was stirred at 60° C. for 20 hours, the reaction product was washed to carry out the K ion exchange operation. This operation was repeated twice, and the product then dried to provide a K type TSZ1.

Then 20 g of the resulting K type TSZ1 was added to 76 cc of an aqueous 0.1 mol/l copper acetate solution, and after the mixture was stirred at room temperature for 20 hours, the reaction product was washed to carry out the Cu ion exchange operation. This operation was repeated twice, and the product then dried to provide a (Cu+K) type TSZ1. As a result of chemical analysis, this zeolite was found to have the following composition in terms of the molar ratio of oxides in the anhydrous basis:

$$0.68K_2O.0.63CuO.Al_2O_3.41.2SiO_2$$

Example 2

An aqueous sodium silicate solution ($SiO_2$; 153 g/l, $Na_2O$: 50 g/l, $Al_2O_3$: 0.8 g/l) and an aqueous aluminum sulfate solution ($Al_2O_3$: 38.4 g/l, $H_2SO_4$; 275 g/l) were fed continuously with stirring at rates of 3.2 l/hr and 0.8 l/hr, respectively, into an overflow type reactor having an actual volume of 2 l. The reaction temperature was from 30° to 32° C. and the pH of the discharged slurry was from 6.4 to 6.6.

The discharged slurry was subjected to solid-liquid separation and the solid was washed with water. Thus a granular amorphous aluminosilicate uniform compound containing 1.72 wt % of $Na_2O$, 2.58 wt % of $Al_2O_3$, 39.3 wt % of $SiO_2$ and 56.4 wt % of $H_2O$ was obtained, and 2,840 g of this uniform compound and 5,160 g of an aqueous 1.39 wt % NaOH solution were fed into an autoclave, and crystallization was carried out with stirring at 160° C. for 72 hours. The reaction product was subjected to solid-liquid separation, washed, and dried to provide a zeolite TSZ2 similar to ZSM-5. The crystal size of TSZ2 was from 0.1 to 0.5 μm. As a result of chemical analysis, the zeolite was found to have the following composition in terms of the molar ratio of oxides in the anhydrous basis:

$$1.1Na_2O.Al_2O_3.23.3SiO_2$$

Then 100 g of this zeolite was added to 1,000 cc of an aqueous solution containing 34.0 g of $NH_4Cl$, and after the mixture was stirred at 60° C. for 20 hours, the reaction product was washed and dried to provide an $NH_4$ type TSZ2. The Na content of the resulting $NH_4$ type TSZ2 was below 0.01 in terms of the $Na_2O/Al_2O_3$ molar ratio.

Then 50 g of this $NH_4$ type TSZ2 was added to 500 cc of an aqueous solution containing 24.8 g of KCl, and after the mixture was stirred at 60° C. for 20 hours, the reaction product was washed to carry out the K ion exchange operation. This operation was repeated twice and the product was dried to provide a K type TSZ2.

Then 20 g of the resulting K type TSZ2 was added to 120 cc of an aqueous 0.1 mol/l copper acetate solution, and after the mixture was stirred at room temperature for 20 hours, the reaction product was washed to carry out the Cu ion exchange operation. This operation was repeated twice, and the product then dried to provide a (Cu+K) type TSZ2. As a result of chemical analysis, the product was found to have the following composition in terms of the molar ratio of oxides in the anhydrous basis:

$$0.54K_2O.0.58CuO.Al_2O_3.23.3SiO_2$$

Example 3

TSZ3 as a ZSM-5 type zeolite was synthesized in accordance with Example 6 of Japanese Unexamined Patent Publication (Kokai) No. 56-45,819. The crystal size of the TSZ3 was from 3 to 5 μm. As a result of chemical analysis, the zeolite was found to have the following composition in terms of the molar ratio of oxides in the anhydrous basis:

$$0.4Na_2O.Al_2O_3.73.2SiO_2$$

Then 100 g of TSZ3 which was calcined at 530° C. for 5 hours was added to 1,000 cc of an aqueous solution containing 12.0 g of $NH_4Cl$, and after the mixture was stirred at 60° C. for 20 hours, the reaction product was washed and dried to provide an $NH_4$ type TSZ3. The Na content of the resulting $NH_4$ type TSZ3 was below 0.01 in terms of the $Na_2O/Al_2O_3$ molar ratio.

Then 50 g of this $NH_4$ type TSZ3 was added to 500 cc of an aqueous solution containing 8.3 g of KCl, and after the mixture was stirred at 60° C. for 20 hours, the reaction product was washed to carry out the K ion exchange operation. This operation was repeated twice, and the product then dried to provide a K type TSZ3.

Then 20 g of the resulting K type TSZ3 was added to 90 cc of an aqueous 0.05 mol/l copper acetate solution, and after the mixture was stirred at room temperature for 20 hours, the reaction product was washed to carry out the Cu ion exchange operation. This operation was repeated twice, and the product then dried to provide a (Cu+K) type TSZ3. As a result of chemical analysis, the product was found to have the following composition in terms of the molar ratio of oxides in the anhydrous basis:

$$0.57K_2O.0.49CuO.Al_2O_3.72.9SiO_2$$

Example 4

First, 20 g of the K type TSZ1 obtained in Example 1 was added to 200 cc of an aqueous solution containing 10.1 g of cobalt (II) acetate tetrahydrate, and after the mixture was stirred at 60° C. for 20 hours, the reaction product was washed to carry out the Co ion exchange operation. This operation was repeated twice, and the product then dried to provide a (Co+K) type TSZ1. As a result of chemical analysis, the zeolite was found to have the following composition in terms of the molar ratio of oxide in the anhydrous basis:

$$0.36K_2O.1.23CoO.Al_2O_3.41.0SiO_2$$

Example 5

First, 20 g of the K type TSZ2 obtained in Example 2 was added to 200 cc of an aqueous solution containing 15.7 g of cobalt (II) acetate tetrahydrate, and after the mixture was stirred at 60° C. for 20 hours, the reaction product was washed to carry out the Co ion exchange operation. This operation was repeated twice and the product then dried to provide a (Co+K) type TSZ2. As a result of chemical analysis, the zeolite was found to have the following composition in terms of the molar ratio of oxides in the anhydrous basis:

$$0.40K_2O.1.14CoO.Al_2O_3.23.3SiO_2$$

Example 6

First, 20 g of the K type TSZ3 obtained in Example 3 was added to 200 cc of an aqueous solution containing 5.9 g of cobalt (II) acetate tetrahydrate, and after the mixture was stirred at 60° C. for 20 hours, the reaction product was washed to carry out the Co ion exchange operation. This operation was repeated twice and the product then dried to provide a (Co+K) type TSZ3. As a result of chemical analysis, the zeolite was found to have the following composition in terms of the molar ratio of oxides in the anhydrous basis:

$0.41K_2O.1.18CoO.Al_2O_3.73.3SiO_2$

Example 7

First, 20 g of the K type TSZ1 obtained in Example 1 was added to 200 cc of an aqueous solution containing 10.2 g of nickel (II) acetate tetrahydrate, and after the mixture was stirred at 60° C. for 20 hours, the reaction product was washed to carry out the Ni ion exchange operation. This operation was repeated twice, and the product then dried to provide a (Ni+K) type TSZ1. As a result of chemical analysis, the zeolite was found to have the following composition in terms of the molar ratio of oxides in the anhydrous basis:

$0.38K_2O.1.17NiO.Al_2O_3.41.0SiO_2$

Example 8

The hydrothermal stability was evaluated using the (Cu+K) type zeolite, (Co+K) type zeolite, and (Ni+K) type zeolite obtained in Examples 1 to 7.

A hydrothermal treatment of each zeolite was carried out at 900° C. for 5 hours under an air stream containing 10% moisture, and the cristallinity before and after this hydrothermal treatment was evaluated by X-ray diffraction. The hydrothermal stability was expressed by the ratio of the cristallinity before the hydrothermal treatment to that after the hydrothermal treatment. Table 1 represents the hydrothermal stability.

TABLE 1

|  | Hydrothermal stability (%) |
|---|---|
| (Cu + K) type TSZ1 | 80 |
| (Cu + K) type TSZ2 | 82 |
| (Cu + K) type TSZ3 | 85 |
| (Co + K) type TSZ1 | 87 |
| (Co + K) type TSZ2 | 86 |
| (Co + K) type TSZ3 | 87 |
| (Ni + K) type TSZ1 | 90 |

Example 9

A (Cu+K+Na) type TSZ1 was obtained in the same way as in Example 1 except that the ammonia treatment of Example 1 was not carried out. As a result of chemical analysis, the zeolite was found to have the following composition in terms of the molar ratio of oxides in the anhydrous basis:

$0.44K_2O.0.57CuO.0.04Na_2O.Al_2O_3.41.0SiO_2$

The hydrothermal stability of the zeolite was found to be 75% when evaluated in the same way as in Example 8.

Example 10

A (K+Cu) type TSZ1 was obtained in the same way as in Example 1 except that the sequence of the K ion exchange operation and the Cu ion exchange operation of Example 1 was reversed. As a result of chemical analysis, the zeolite was found to have the following composition in terms of the molar ratio of oxides in the anhydrous basis:

$0.72CuO.0.92K_2O.Al_2O_3.41.2SiO_2$

The hydrothermal stability of the zeolite was found to be 73% when evaluated in the same way as in Example 8.

Comparative Example 1

Cu type TSZ1, Co type TSZ1 and Ni type TSZ1 were obtained in the same way as in Examples 1, 4 and 7, respectively, except that the K ion exchange operation of Examples 1, 4 and 7 was not carried out. As a result of chemical analysis, these zeolites were found to have the following compositions in terms of the mole ratio of oxides in the anhydrous basis, respectively:

Cu type TSZ1
$0.82CuO.Al_2O_3.40.9SiO_2$
Co type TSZ1
$1.35CoO.Al_2O_3.41.0SiO_2$
Ni type TSZ1
$1.41NiO.Al_2O_3.40.8SiO_2$ Comparative Example 2

The hydrothermal stability was evaluated using the Cu type TSZ1, Co type TSZ1 and Ni type TSZ1 obtained in Comparative Example 1 in the same way as in Example 8. The results are shown in Table 2.

TABLE 2

|  | Hydrothermal stability (%) |
|---|---|
| Cu type TSZ1 | 60 |
| Co type TSZ1 | 65 |
| Ni type TSZ1 | 69 |

First, 20 g of the K type TSZ1 obtained in Example 1 was added to 100 cc of an aqueous solution containing 5.0 g of cobalt (II) acetate tetrahydrate, and the mixture was evaporated at 90° C. and dried to provide a Co/K type TSZ1. As a result of chemical analysis, the zeolite was found to have the following composition in terms of the molar ratio of oxides in the anhydrous basis:

$2.5CoO.0.87K_2O.Al_2O_3.41.2SiO_2$

The hydrothermal stability of the zeolite was found to be 42% when evaluated in the same way as in Example 8.

Example 11

First, 50 g of the NH$_4$ type TSZ1 obtained in Example 1 was added to 500 cc of an aqueous solution containing 32.8 g of CsCl, and after the mixture was stirred at 60° C. for 20 hours, the reaction product was washed to carry out the Cs ion exchange operation. This operation was repeated twice, and the product then dried to provide a Cs type TSZ1.

Then 20 g of the resulting Cs type TSZ1 was added to 76 cc of an aqueous 0.1 mol/l copper acetate solution, and after the mixture was stirred at room temperature for 20 hours, the reaction product was washed to carry out the Cu ion exchange operation. This operation was repeated twice, and the product then dried to provide a (Cu+Cs) type TSZ1. As a result of chemical analysis, the zeolite was found to have the following composition in terms of the molar ratio of oxides in the anhydrous basis:

$$0.60Cs_2O.0.43CuO.Al_2O_3.41.1SiO_2$$

As a result of X-ray diffraction, the zeolite crystal was found to be an orthorhombic system.

Example 12

First, 50 g of the NH4 type TSZ2 obtained in Example 2 was added to 500 cc of an aqueous solution containing 56.0 g of CsCl, and after the mixture was stirred at 60° C. for 20 hours, the reaction product was washed to carry out the Cs ion exchange operation. This operation was repeated twice, and the product then dried to provide a Cs type TSZ2.

Then 20 g of the resulting Cs type TSZ2 was added to 120 cc of an aqueous 0.1 mol/l copper acetate solution, and after tile mixture was stirred at room temperature for 20 hours, the reaction product was washed to carry out the Cu ion exchange operation. This operation was repeated twice, and the product then dried to provide a (Cu+Cs) type TSZ2. As a result of chemical analysis, the zeolite was found to have the following composition in terms of the molar ratio of oxides in the anhydrous basis:

$$0.61Cs_2O.0.53CuO.Al_2O_3.23.3SiO_2$$

As a result of X-ray diffraction, the zeolite crystal was found to be an orthorhombic system.

Example 13

First, 50 g of the NH4 type TSZ3 obtained in Example 3 was added to 500 cc of an aqueous solution containing 18.8 g of CsCl, and after the mixture was stirred at 60° C. for 20 hours, the reaction product was washed to carry out the Cs ion exchange operation. This operation was repeated twice, and the product then dried to provide a Cs type TSZ3.

Then 20 g of the resulting Cs type TSZ3 was added to 90 cc of an aqueous 0.05 mol/l copper acetate solution, and after the mixture was stirred at room temperature for 20 hours, the reaction product was washed to carry out the Cu ion exchange operation. This operation was repeated twice and the product was dried to provide a (Cu+Cs) type TSZ3. As a result of chemical analysis, the zeolite was found to have the following composition in terms of the molar ratio of oxides in the anhydrous basis:

$$0.62Cs_2O.0.48CuO.Al_2O_3.72.9SiO_2$$

As a result of X-ray diffraction, the zeolite crystal was found to be an orthorhombic system.

Example 14

First, 20 g of the Cs type TSZ1 obtained in Example 11 was added to 200 cc of an aqueous solution containing 10.1 g of cobalt (II) acetate tetrahydrate, and after the mixture was stirred at 60° C. for 20 hours, the reaction product was washed to carry out the Co ion exchange operation. This operation was repeated twice, and the product then dried to provide a (Co+Cs) type TSZ1. As a result of chemical analysis, the zeolite was found to have the following composition in terms of the molar ratio of oxides in the anhydrous basis:

$$0.50Cs_2O.1.12CoO.Al_2O_3.41.0SiO_2$$

As a result of X-ray diffraction, the zeolite crystal was found to be an orthorhombic system.

Example 15

First, 20 g of the Cs type TSZ2 obtained in Example 12 was added to 200 cc of an aqueous solution containing 15.7 g of cobalt (II) acetate tetrahydrate, and after the mixture was stirred at 60° C. for 20 hours, the reaction product was washed to carry out the Co ion exchange operation. This operation was repeated twice and the reaction product then dried to provide a (Co+Cs) type TSZ2. As a result of chemical analysis, the zeolite was found to have the following composition in terms of the molar ratio of oxides in the anhydrous basis:

$$0.51Cs_2O.1.05CoO.Al_2O_3.23.2SiO_2$$

As a result of X-ray diffraction, the zeolite crystal was found to be an orthorhombic system.

Example 16

First, 20 g of the Cs type TSZ3 obtained in Example 13 was added to 200 cc of an aqueous solution containing 5.9 g of cobalt (II) acetate tetrahydrate, and after the mixture was stirred at 60° C. for 20 hours, the reaction product was washed to carry out the Co ion exchange operation. This operation was repeated twice, and the product then dried to provide a (Co+Cs) type TSZ3. As a result of chemical analysis, the zeolite was found to have the following composition in terms of the molar ratio of oxides in the anhydrous basis:

$$0.52Cs_2O.0.96CoO.Al_2O_3.73.2SiO_2$$

As a result of X-ray diffraction, the zeolite crystal was found to be an orthorhombic system.

Example 17

First, 20 g of the Cs type TSZ1 obtained in Example 11 was added to 200 cc of an aqueous solution containing 10.2 g of nickel (II) acetate tetrahydrate, and after the mixture was stirred at 60° C. for 20 hours, the reaction product was washed to carry out the Ni ion exchange operation. This operation was repeated twice and the product then dried to provide a (Ni+Cs) type TSZ1. As a result of chemical analysis, the zeolite was found to have the following composition in terms of the molar ratio of oxides in the anhydrous basis:

$$0.50Cs_2O.1.23NiO.Al_2O_3.41.0SiO$$

As a result of X-ray diffraction, the zeolite crystal was found to be an orthorhombic system.

Example 18

The hydrothermal stability of the (Cu+Cs) type zeolite, (Co+Cs) type zeolite and (Ni+Cs) type zeolite obtained in Examples 11 to 17 were evaluated in the same way as in Example 8.

Table 3 represents the hydrothermal stability and the crystal system after the hydrothermal treatment.

TABLE 3

| | Hydrothermal stability (%) | Crystal system |
|---|---|---|
| (Cu + Cs) type TSZ1 | 82 | orthorhombic system |
| (Cu + Cs) type TSZ2 | 84 | orthorhombic system |
| (Cu + Cs) type TSZ3 | 86 | orthorhombic system |
| (Co + Cs) type TSZ1 | 85 | orthorhombic system |
| (Co + Cs) type TSZ2 | 87 | orthorhombic system |
| (Co + Cs) type TSZ3 | 89 | orthorhombic system |
| (Ni + Cs) type TSZ1 | 91 | orthorhombic system |

Example 19

A (Cu+Cs+Na) type TSZ1 was obtained in the same way as in Example 11 except that the ammonia treatment of Example 11 was not carried out. As a result of chemical analysis, the zeolite was found to have the following composition in terms of the molar ratio of oxides in the anhydrous basis:

$$0.48Cs_2O \cdot 0.53CuO \cdot 0.03Na_2O \cdot Al_2O_3 \cdot 41.0SiO_2$$

As a result of X-ray diffraction, the zeolite crystal was found to be an orthorhombic system.

The hydrothermal stability of the zeolite was found to be 78% when evaluated in the same way as in Example 8. The crystal after the hydrothermal treatment was found to be an orthorhombic system.

Example 20

A (Cs+Cu) type TSZ1 was obtained in the same way as in Example 11 except that the sequence of the Cs ion exchange operation and the Cu ion exchange operation of Example 11 was reversed. As a result of chemical analysis, the zeolite was found to have the following composition in terms of the molar ratio of oxides in the anhydrous basis:

$$0.81CuO \cdot 0.89Cs_2O \cdot Al_2O_3 \cdot 41.2SiO_2$$

As a result of X-ray diffraction, the zeolite crystal was found to be an orthorhombic system.

The hydrothermal stability of this zeolite was found to be 72% when evaluated in the same way as in Example 8. The crystal after the hydrothermal treatment was found to be an orthorhombic system.

Comparative Example 4

First, 20 g of the Cs type TSZ1 obtained in Example 11 was mixed with 100 cc of an aqueous solution containing 5.0 g of cobalt (II) acetate tetrahydrate, and the mixture was evaporated at 90° C. and dried to provide a Co/Cs type TSZ1. As a result of chemical analysis, the zeolite was found to have the following composition in terms of the molar ratio of oxides in the anhydrous basis:

$$2.5CoO \cdot 0.88Cs_2O \cdot Al_2O_3 \cdot 41.2SiO_2$$

As a result of X-ray diffraction, the zeolite crystal was found to be an orthorhombic system.

The hydrothermal stability of this zeolite was found to be 47% when evaluated in the same way as in Example 8. The crystal after the hydrothermal treatment was found to be a monoclinic system.

As is obvious from the Examples and Comparative Examples given above, the transition metal-containing zeolite having a high hydrothermal stability in accordance with the present invention exhibits a very high hydrothermal stability with little drop of the crystallinity even at high temperatures in the presence of steam.

Example 21

A durability was evaluated using the transition metal-containing zeolites obtained in Examples 1–7, 9–17, 19 and 20.

After press-molding, each zeolite was pulverized and assorted to granules having a mesh size of 12 to 20, and 2 cc of the granules were packed into an atmospheric pressure fixed bed flow type reactor. A gas (having the composition shown in Table 4) simulating an exhaust gas of a lean burn engine was passed therethrough at a space velocity of 30,000/hr, and after a pre-treatment was carried out at 500° C. for 30 minutes, a steady purification activity at 400° C. was measured. This steady purification activity was expressed by an NOx conversion after one hour at 400° C.

The endurance treatment was carried out at 800° C. for 15 hours on-stream with flowing the gas having the composition shown in Table 4 at a space velocity of 30,000/hr. Thereafter, the steady purification activity was measured by the same method as described above, to thus conduct the durability test.

The results obtained are shown in Tables 5 and 6.

TABLE 4

| Component | Gas composition |
|---|---|
| Co | 0.1 vol % |
| $H_2$ | 0.033 vol % |
| $C_3H_6$ | 0.04 vol % |
| NO | 0.06 vol % |
| $CO_2$ | 10 vol % |
| $H_2O$ | 3 vol % |
| $N_2$ | Balance |

TABLE 5

| | NOx conversion (%) | |
|---|---|---|
| Catalyst | Before endurance treatment | After endurance treatment |
| (Cu + K) type TSZ1 | 50 | 37 |
| (Cu + K) type TSZ2 | 54 | 32 |
| (Cu + K) type TSZ3 | 49 | 35 |
| (Co + K) type TSZ1 | 59 | 41 |
| (Co + K) type TSZ2 | 57 | 33 |
| (Co + K) type TSZ3 | 56 | 39 |
| (Ni + K) type TSZ1 | 48 | 36 |
| (Cu + K + Na) type TSZ1 | 56 | 29 |
| (K + Cu) type TSZ1 | 50 | 28 |

TABLE 6

| | NOx conversion (%) | |
|---|---|---|
| Catalyst | Before endurance treatment | After endurance treatment |
| (Cu + Cs) type TSZ1 | 50 | 33 |
| (Cu + Cs) type TSZ2 | 52 | 30 |
| (Cu + Cs) type TSZ3 | 48 | 32 |
| (Co + Cs) type TSZ1 | 58 | 36 |
| (Co + Cs) type TSZ2 | 56 | 30 |
| (Co + Cs) type TSZ3 | 55 | 33 |
| (Ni + Cs) type TSZ1 | 44 | 32 |
| (Cu + Cs + Na) type TSZ1 | 54 | 27 |

TABLE 6-continued

| Catalyst | NOx conversion (%) | |
|---|---|---|
| | Before endurance treatment | After endurance treatment |
| (Cs + Cu) type TSZ1 | 50 | 26 |

The durability of the zeolite crystal was determined by evaluating the cristallinity before and after the endurance treatment by X-ray diffraction. The crystal durability was expressed by the ratio of the cristallinity after the endurance treatment to that before the endurance treatment. The results obtained are shown in Tables 7 and 8.

TABLE 7

| Catalyst | Crystal durability (%) |
|---|---|
| (Cu + K) type TSZ1 | 90 |
| (Cu + K) type TSZ2 | 88 |
| (Cu + K) type TSZ3 | 92 |
| (Co + K) type TSZ1 | 91 |
| (Co + K) type TSZ2 | 88 |
| (Co + K) type TSZ3 | 93 |
| (Ni + K) type TSZ1 | 94 |
| (Cu + K + Na) type TSZ1 | 86 |
| (K + Cu) type TSZ1 | 86 |

TABLE 8

| Catalyst | Crystal durability (%) |
|---|---|
| (Cu + Cs) type TSZ1 | 93 |
| (Cu + Cs) type TSZ2 | 90 |
| (Cu + Cs) type TSZ3 | 97 |
| (Co + Cs) type TSZ1 | 95 |
| (Co + Cs) type TSZ2 | 91 |
| (Co + Cs) type TSZ3 | 98 |
| (Ni + Cs) type TSZ1 | 97 |
| (Cu + Cs + Na) type TSZ1 | 88 |
| (Cs + Cu) type TSZ1 | 89 |

Comparative Example 5

The exhaust gas purification performance and durability were evaluated using the transition metal-containing zeolites obtained in Comparative Examples 1, 3 and 4 in the same way as in Example 21.

The results obtained are shown in Tables 9 and 10.

TABLE 9

| Catalyst | NOx conversion (%) | |
|---|---|---|
| | Before endurance treatment | After endurance treatment |
| Cu type TSZ1 | 49 | 23 |

TABLE 9-continued

| Catalyst | NOx conversion (%) | |
|---|---|---|
| | Before endurance treatment | After endurance treatment |
| Co type TSZ1 | 57 | 19 |
| Ni type TSZ1 | 39 | 17 |
| Co/K type TSZ1 | 36 | 13 |
| Co/CS type TSZ1 | 35 | 11 |

TABLE 10

| Catalyst | Crystal durability % |
|---|---|
| Cu type TSZ1 | 75 |
| Co type TSZ1 | 80 |
| Ni type TSZ1 | 82 |
| Co/K type TSZ1 | 61 |
| Co/Cs type TSZ1 | 63 |

As is obvious from the Examples and Comparative Examples given above, the exhaust gas purification catalyst in accordance with the present invention has a high exhaust gas purification performance, has a small drop in the crystallinity of the zeolite even when exposed to a high temperature exhaust gas with a co-existing steam, and exhibits a superior durability.

What is claimed is:

1. A method of purifying an exhaust gas comprising bringing a combustion exhaust gas containing nitrogen oxides into contact with a catalyst, wherein said catalyst comprises a transition metal ion-exchanged zeolite having high hydrothermal stability of formula (I) in terms of a molar composition of oxides:

$$aA_2O.bM_{2/n}O.Al_2O_3.cSiO_2.dH_2O \qquad (I)$$

wherein a is 0.2 to 1.0, b is more than 0 but not more than 1.5, c is at least 10, d is an arbitrary number, A is potassium or cesium, M is a transition metal and n is a valence number of the metal M, the sodium content of the transition metal ion-exchanged zeolite being not more than 0.01 in terms of a molar ratio $Na_2O/Al_2O_3$ and said transition metal ion-exchanged zeolite being produced by the steps of first subjecting a zeolite to an ion-exchange treatment with a neutral salt of potassium or cesium and then to an ion-exchange treatment with a neutral salt of a transition metal.

2. A method of purifying an exhaust gas according to claim 1, wherein c is 20 to 100.

3. A method of purifying an exhaust gas according to claim 1, wherein a molar ratio of $(A_2O+M_{2/n}O)/Al_2O_3$ is not more than 2.0.

4. A method of purifying an exhaust gas according to claim 1, wherein the transition metal is at least one metal selected from the group consisting of Fe, Cu, Co, Ni, Cr and Mn.

* * * * *